(12) United States Patent
McGovern et al.

(10) Patent No.: US 8,051,404 B2
(45) Date of Patent: Nov. 1, 2011

(54) SOFTWARE DEVELOPMENT

(75) Inventors: Fergal McGovern, Bray (IE); Martin Chapman, Dublin (IE); Garrett Conaty, Los Osos, CA (US); Philip Head, Dorset (GB); Michael Hogan, Co Oppaly (IE)

(73) Assignee: Micro Focus (IP) Limited, Newbury, Berkshire (GB)

(*) Notice: Subject to any disclaimer, the term of this patent is extended or adjusted under 35 U.S.C. 154(b) by 1169 days.

(21) Appl. No.: 10/415,466

(22) PCT Filed: Oct. 26, 2001
(Under 37 CFR 1.47)

(86) PCT No.: PCT/GB01/04772
§ 371 (c)(1),
(2), (4) Date: Oct. 26, 2004

(87) PCT Pub. No.: WO02/35342
PCT Pub. Date: May 2, 2002

(65) Prior Publication Data
US 2005/0125769 A1  Jun. 9, 2005

(30) Foreign Application Priority Data
Oct. 26, 2000 (EP) ..................... 00650171

(51) Int. Cl.
*G06F 9/44* (2006.01)
(52) U.S. Cl. ........ 717/109; 717/105; 717/114; 717/125; 717/126
(58) Field of Classification Search ............... None
See application file for complete search history.

(56) References Cited

U.S. PATENT DOCUMENTS

| | | | | |
|---|---|---|---|---|
| 5,892,947 A * | 4/1999 | DeLong et al. | ............... | 717/100 |
| 6,415,396 B1 * | 7/2002 | Singh et al. | ............ | 714/38 |
| 6,505,342 B1 * | 1/2003 | Hartmann et al. | .......... | 717/104 |
| 6,647,513 B1 * | 11/2003 | Hekmatpour | ............ | 714/37 |
| 6,851,105 B1 * | 2/2005 | Coad et al. | ............ | 717/106 |
| 7,334,216 B2 * | 2/2008 | Molina-Moreno et al. | ... | 717/109 |
| 7,430,732 B2 * | 9/2008 | Cwalina et al. | .............. | 717/126 |
| 2002/0066074 A1 * | 5/2002 | Jabri | ............ | 717/105 |
| 2002/0091990 A1 * | 7/2002 | Little et al. | .......... | 717/105 |
| 2004/0143819 A1 * | 7/2004 | Cheng et al. | ............ | 717/125 |
| 2004/0187093 A1 * | 9/2004 | Hogan | .......... | 717/114 |
| 2004/0205703 A1 * | 10/2004 | Harel et al. | ............ | 717/109 |

OTHER PUBLICATIONS

"Writing Effective Use Cases", A. Cockburn, 1999, 204 pages, <www2.dis.ulpgc.es/~jsanchez/MDS/EffectiveUseCases.pdf>.*
"Collaborative design with use case scenarios", Davis et al., Jan. 2001, pp. 146-147, <http://delivery.acm.org/10.1145/380000/379472/p146-davis.pdf>.*
"How use case modeling policies have affected the success of various projects (or how to improve use case modeling)", Chandrasekaran, Jan. 1997, pp. 6-9, <http://delivery.acm.org/10.1145/280000/274569/p6-chandrasekaran.pdf>.*

(Continued)

*Primary Examiner* — Thuy Dao
(74) *Attorney, Agent, or Firm* — Kokka & Backus, PC

(57) ABSTRACT

A method of developing software capable of performing a task, the task comprising at least one task step required to perform the task. The task step has a resultant effect. The method comprises recording a use case comprising one or more scenarios, that comprise one of more further steps; recording the scenario or one of the scenarios as a main success scenarios such that the resultant effect of the main success scenario is the same as the resultant effect of the task step. Use cases which have been stripped of context-specific information may be re-used. Such information may be included in a reference to the re-used use case.

13 Claims, 15 Drawing Sheets

OTHER PUBLICATIONS

Buhr, R.J.A. "Use Case Maps as Architectural Entities for Complex Systems," IEEE Transactions on Software Engineering, IEEE Inc. New York, NY, U.S.A. vol. 24, No. 12, Dec. 1998, pp. 1131-1155.

Sutcliffe, A.G., et al. "Supporting Scenario-Based Requirements Engineering," IEEE Transactions on Software Engineering, IEEE Inc. New York, NY, U.S.A. vol. 24, No. 12, Dec. 1998, pp. 1072-1088.

Ivar Jacobson, "Object-Oriented Software Engineering", Addison-Wesley (1996), pp. 156-166.

* cited by examiner

SOFTWARE DEVELOPMENT

This Application is a National Phase of International Application No. PCT/GB01/04772, filed on Oct. 26, 2001, which claims priority from European Patent Application No. 00650171.2, filed on Oct. 26, 2000.

BACKGROUND OF THE INVENTION

This invention relates to development of software, and more particularly to methods, software and tools to facilitate such development.

Software development projects in many cases involve as much manpower resources as architectural or civil engineering projects, however, the progress and the results are not as easy to visualise. Thus software development involving more than one person has always been difficult to control effectively, and for this reason it has been the consensus for some time that a defined process is required. Development without a process gives rise to the following problems:
- over-reliance on having the right people.
- Difficulties in co-ordination and communication between people.
- Inaccurate planning.
- Lack of code/module re-use.
- Lack of predictability of the software.

Processes have been developed in recent years, however, for various reasons they have not been widely used. The following are some of the problems:
- The process is not suitable for Object-Oriented (O) development.
- There is a perception that implementation of a process involves too much overhead and additional developer time.
- There is a perception that projects below a certain size are too small for implementation of a process.
- The available processes do not strike a good balance between the traditional "waterfall" approach in which every stage must be completely finished before proceeding to the next stage, and the other extreme of constantly iterating in apparently endless cycles.

SUMMARY OF THE INVENTION

It is an aim of the present invention at least partially to alleviate these problems.

When viewed from a first aspect, the present invention provides a method of developing software capable of performing a task, said task comprising at least one task step required to perform said task, the step having a resultant effect, wherein the method comprises: recording a use case comprising one or more scenarios, the or each scenario comprising one or more further steps; and recording said scenario or one of said scenarios as a main success scenario such that the resultant effect of said main success scenario is the same as the resultant effect of said step.

Thus it will be seen by those skilled in the art that in accordance with the present invention a software development method is provided whereby a task step to be carried out by the software may be broken down by means of a main success scenario which has further steps which add up to the same net effect as the overall task step. In other words detail may be added to each step in an organised and straightforward way. This process may, and typically will, be continued for several layers.

In other words, for some or all of the 'further' steps in the main success scenario, there may be recorded use cases which themselves have main success scenarios and a number of yet further steps. Detail may continue to be added until such time as there is sufficient detail to translate into code. Thus the same use case structure may be applied at all levels of abstraction throughout the software development life cycle.

Such an organised structure is beneficial in the development of software as it ensures openness during the development process and, for example, allows easy evaluation of the extent of development which has been achieved at any given point in the software development life cycle.

The relationship between a task step and its more detailed use case is known as a refinement relationship and in preferred embodiments, the method comprises recording a refinement relationship which links the task step to the use case. By recording the relationship, it is clear how further detail has been added. Preferably the method comprises recording a justification for said refinement relationship, said justification demonstrating how the resultant effect of the main success scenario within the more detailed use case equals the resultant effect of the task step.

Use cases in accordance with the invention may be allowed only a main success scenario. Preferably however the use case may also have one or more alternative scenarios. The alternative scenario(s) may not have a resultant effect which is the same as that of the task step which the use case refines.

In some preferred embodiments, the use case has a required post-condition. That is, a condition which must be satisfied once the use case has been executed. A post-condition may be visually represented as applying to the use case as a whole, but preferably is represented in a meta model as applying to the main success scenario—since an alternative scenario may not be able to meet the post-condition.

In some preferred embodiments, the use case has a required pre-condition. That is, a condition that must be satisfied before the use case is executed. A pre-condition may be applied to the use case as a whole since it does not depend on whether the main success scenario or an alternative scenario is followed.

It will be appreciated by those skilled in the art that the methods set out hereinabove in accordance with the invention may benefit any single software development project or part of a project by giving enhanced structure and visibility to the project. This is true even if all of the task steps and use cases are built from scratch. Preferably, however, the method comprises recording a reference to one or more use cases stored elsewhere—i.e. that have been previously built. This is extremely beneficial in allowing use cases to be reused. Not only does this save the time that would otherwise have been taken to build the use case, but also the time associated with checking, testing, validating etc. The use case referred to may previously have been built in an earlier project or in a different part of the same project.

It will be appreciated that uses cases at any level of detail may be reused. Where a higher level use case is reused, the further steps comprised in its main success or alternative scenarios will be reused. These further steps may themselves be refined into lower level use cases which might, although need not necessarily, also be reused. In other words, if a user reuses a use case he/she may utilise the refinements within it, or equally may define new refinements, subject to any pre- or post-conditions. It will be appreciated that this is an advantage conferred by the fact that the resultant effect of the task step and the main success scenario of the refining use case are ensured to be the same.

The benefits of reusing use cases may be achieved by reusing the same use case in the same context in which it was built. In these circumstances, the use case could be specific to that context. It is preferred however that use cases do not contain any context-specific information. For example any context-specific information required for the use case could be recorded separately, e.g. in a separate reference object rather than in the use case itself.

The term context, when applied to use cases, should be understood as referring to the ability to specify additional attributes of that use case which are specific to the particular environment in which the use case is used, without affecting the pre- and/or post-conditions (where provided for) of the use case itself. For example the context of a use case may be the project in which the use case is used. In this case the context specific information could be attributes such as the priority of that use case in that project, or the delivery increment in which it is due to be delivered. Alternatively the context of a use case may be a subset of a whole project.

Effectively this means that the structure of the use case, i.e. the collection of steps and optional pre- and/or post-conditions, may be maintained while allowing the use case to show context-specific attributes. By separating a Use Case into two types: a pure use case and a use case reference, and relating these two types by means of a reference relationship, reuse of use cases across different contexts, e.g. different projects, may be achieved.

This apparently simple feature in fact greatly enhances the power and value of reusability in accordance with the invention. By stripping use cases of their context, the opportunity for reusing them becomes significantly greater and the avoidance of repeated effort may be optimised. For example, the task step "Make Payment" may be used in a business model to pay for received goods, issue a refund or award a prize. Regardless of the business context that the use case is used in, its resultant effect is still the same: money passes from payer to payee.

Such an arrangement is considered to be novel and inventive in it's own right and thus when viewed from a further aspect the invention provides a method of developing software capable of performing a task, said task comprising at least one main step required to perform said task, the main step having a resultant effect, wherein the method comprises recording a reference to a use case comprising one or more further steps such that said further steps have a resultant effect which is the same as the resultant effect of the main step; wherein said use case is stored elsewhere and has no context-specific information, thereby allowing re-use of said use case.

At least some use cases may be stored in the part of the project where they are first built. This is most applicable in the circumstances of reuse within a given software development project. Additionally or alternatively, use cases may be stored in a repository. This is most applicable in the circumstances of reuse between separate software development projects. Indeed as well as storing use cases which are built in the context of a particular project, such an approach allows use cases to be proactively built outside of any particular project for employment in subsequent projects.

The use cases in a repository of the type set out above may simply be stored there once they have been built. Preferably however the repository comprises a separate section for storing use cases which have been 'qualified'—i.e. those which have been tested, checked for lack of context-specific information, or had context-specific information removed.

In the following, the term "collaboration" may be taken to be interchangeable with the term "use case". Furthermore the term "action" may be taken to be interchangeable with the term "step" or "task step". No inference is to be drawn by use of the former term rather than the latter or vice versa.

When viewed from a yet further aspect the present invention provides a software development method comprising the steps of defining process workflows for use cases and roles, wherein:

the use cases are represented as actions, each having an associated effect defining a required post-condition for the action; and use cases are stored in an asset repository according to a meta model which allows retrieval of use cases for re-use.

In one embodiment, at least some use cases are represented in the meta model as a collaboration linked to actions, in which each action and the collaboration is linked to an associated effect, and the collaboration is a more detailed representation of the actions. In one embodiment, each effect states both a pre-condition and a post-condition.

In one embodiment, a collaboration is linked to an action by a refinement relationship. In one embodiment, the refinement relationship states what stage of the project life-cycle the project is at.

In one embodiment, there is a justification associated with each refinement relationship, stating how the action is realised by the refining collaboration.

In one embodiment, the method uses a predicate justification stating how each clause in an action's pre-condition expression is realised by a clause in a collaboration pre-condition.

In one embodiment, the method uses a diagrammatic justification defining how entities of the action are realised in the refining collaboration.

In one embodiment, a model for a project is generated from the meta model by re-use of parts of the meta model in the asset repository.

In one embodiment, the model is generated by use of an include pattern for inclusion of actions and collaborations of the meta model.

In one embodiment, the model comprises only a reference to a collaboration or action, the actual action or collaboration being stored in the meta model.

In one embodiment, the model is extended by inheriting behaviour of reference types and refinement of included collaborations.

In one embodiment, the meta model models a business context for a business process.

In one embodiment, the method uses a proactive content group that proactively creates re-useable artefacts.

In one embodiment, the method comprises the step of mapping requirements to software components for technical mapping.

In one embodiment, the meta model represents use cases at different levels of abstraction and in different contexts.

In one embodiment, the meta model comprises refinement relationships linking views of processes at different levels of detail to provide traceability.

In one embodiment, a refinement relationship links an action to a collaboration, in which a collaboration is a more detailed representation of an action.

In one embodiment, the meta model represents use cases independent of context, and allows a context to be applied without change to a base use case.

According to another aspect, the invention provides a software development system comprising means for defining process workflows for use cases and roles in a method as defined above.

When viewed from further aspects the present invention provides respectively a software development tool, a computer program product and complementary client and sever software for carrying out the methods set out hereinabove.

BRIEF DESCRIPTION OF THE DRAWINGS

Certain preferred embodiments of the present invention will now be described, by way of example only, with reference to the accompanying drawings in which.

DETAILED DESCRIPTION

Figure 1:
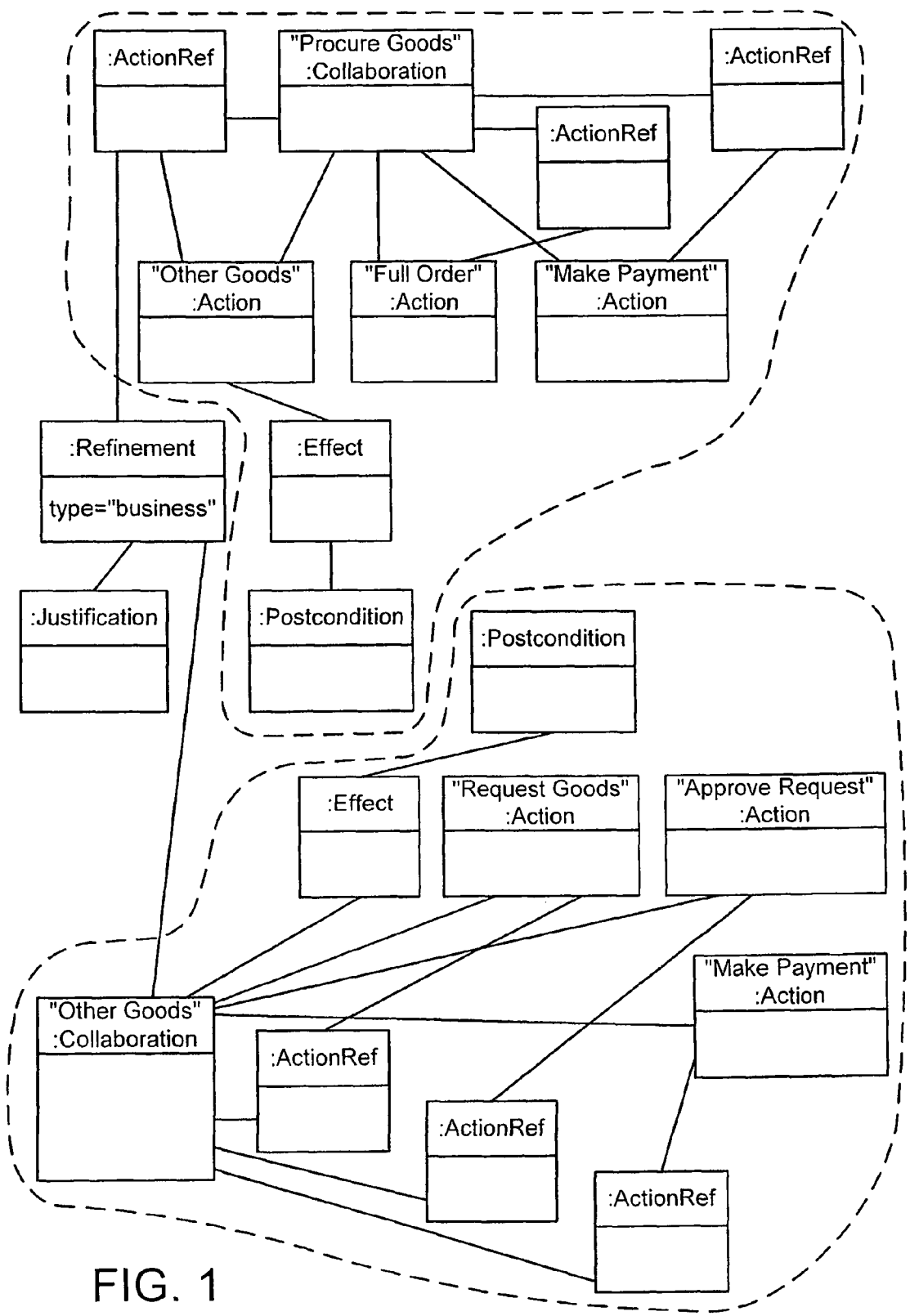
FIG. 1 is a diagram showing refinement using a meta model in accordance with an embodiment of the present invention.

An embodiment of the invention is described in detail below with reference to FIGS. 1 to 14.

In at least the preferred embodiments, the invention provides a software development process which allows iteration, but does so in a well-controlled manner.

A use case may, for example, be "Purchase Goods" in a shopping portal. Although a use case may be nothing more than a textual description of functionality, when used correctly it is a very effective tool for "fencing in" the project scope and allows for excellent segmentation of deliverables within the project plan. Also, use cases define a set of requirements for a project, allowing a project manager to implement change control in a well-defined and transparent way. Thus if a customer decides to change direction during a project then there is a verifiable "audit trail" of easily understood use cases that allow the changes to be quantified for planning purposes.

A problem with the known Rational RUP approach is that iterations are difficult to control in many projects. In some embodiments of the present invention, this is overcome by defining work-flows which collectively describe the project life-cycle. Each workflow corresponds to a set of activities, the outputs (artefacts) of which are verifiable and facilitate a clear progression within the project life-cycle. At the end of a work-flow all outputs are clearly defined and verifiable. Each workflow has a predecessor and a successor, with the exception of the first and the last.

Each iteration corresponds to a set of completed functional groups, a functional group comprising one or more related use cases. Iterations are controlled and may be run in parallel, sequentially, or a hybrid of both depending on the inter-dependencies between functional groups themselves and between the functional groups and shared packages. The project manager and senior technical people decide on the dependencies.

A preferred embodiment of the invention also provides an asset repository, in which an asset is a reusable artefact developed during the project life-cycle. The asset repository comprises a meta model and content. Content is knowledge related to the delivery of systems and is embodied in reusable artefacts. The meta model is a schema for storage of the content.

The problem of demonstrating that certain software components actually deliver on their requirements is referred to as "traceability". For example, the following are two use cases; "Procure Goods", a highly abstract representation of a procurement process, and "Order Goods", a representation of one of the sub-actions of the Procure Goods use case.

Use Case 1, Procure Goods

| Characteristic Information | |
|---|---|
| Description/Goal of use case: | To procure goods using one of several procurement techniques |
| Primary Actor: | Buyer |
| Precondition: | None |
| Success End Condition: | Buyer owns procured goods and has paid for them. |

Main Success Scenario
 1. The buyer orders goods from a supplier.
 2. The buyer pays the supplier for the goods.
 3. The supplier fulfils the order.
 4. The use case ends.

Use Case 2: Order Goods (expansion of step 1 in the main success scenario of use case 1)

| Characteristic Information | |
|---|---|
| Description/Goal of use case: | To formally request goods from a supplier |
| Primary Actor: | Buyer |
| Precondition: | None |
| Success End Condition: | An order for the buyer's required goods is placed with a supplier. |

Main Success Scenario
 1. The buyer requests the goods by submitting a purchase request to the purchasing department.
 2. The purchasing department approves the request.
 3. The purchasing department creates a purchase order and sends it to the supplier.
 4. The use case ends.

Traceability is achieved by a mechanism known as "Refinement". Refinement is the linking of two views of a business process, where one view is a more detailed representation of the other. Noting that progressing through the stages of a software life-cycle essentially boils down to adding detail, it becomes clear that refinement is the means by which the project manager can trace from requirements to code. The diagram of FIG. 1 shows how the two use cases can be represented using an object diagram. Use case 1 is represented by the Collaboration "Procure Goods". It contains three Actions (steps)—"Order Goods", "Fulfill Order" and "Make Payment". These actions (steps) represent the steps in the "Main Success Scenario" of the use case. All Actions (steps) have an "Effect" that states its precondition and postcondition (but only the Effect for "Order Goods" is shown in the diagram). The second use case "Order Goods", is represented by the Collaboration (use case) of the same name. It too contains three actions (steps) that represent the steps of the main success scenario.

Figure 2:
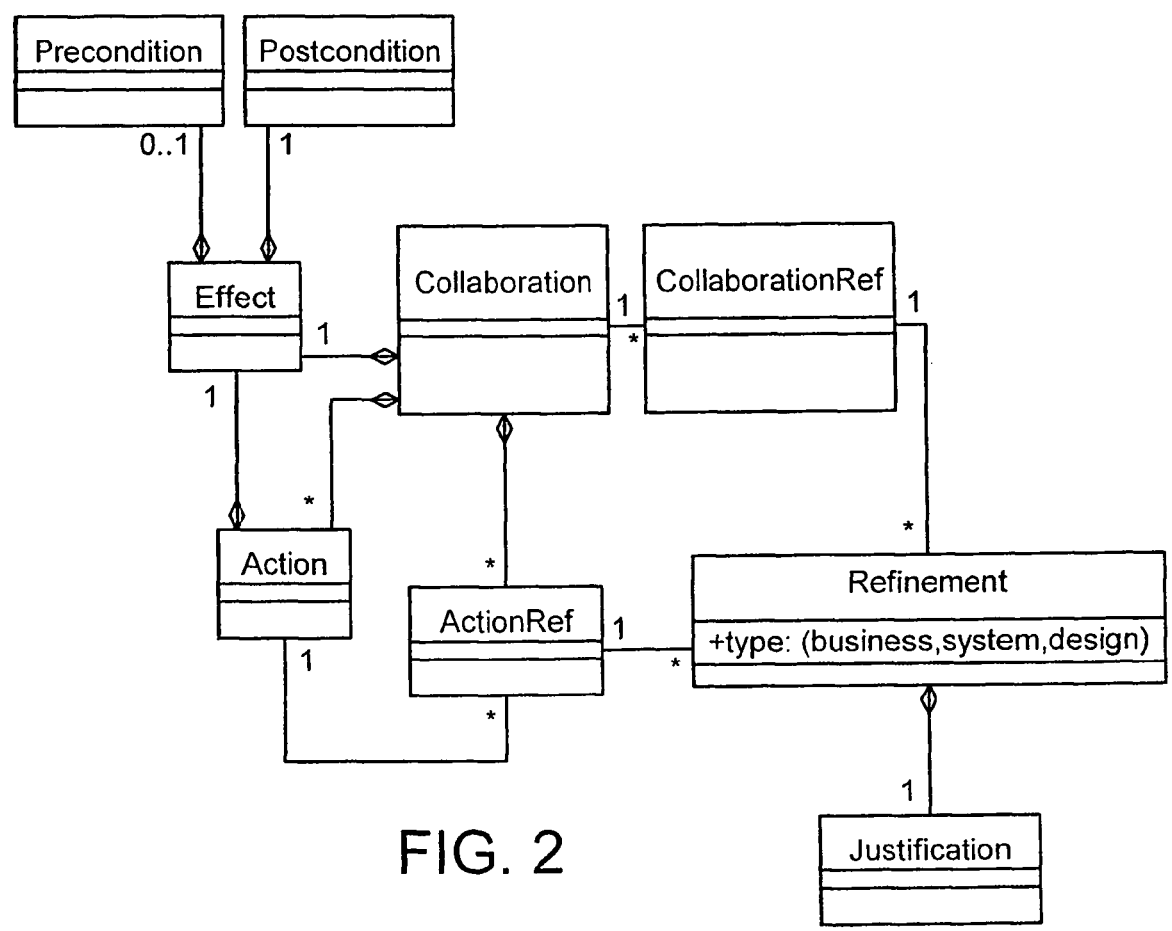
FIG. 2 is a diagram showing refinement in the meta model.
Figure 3:
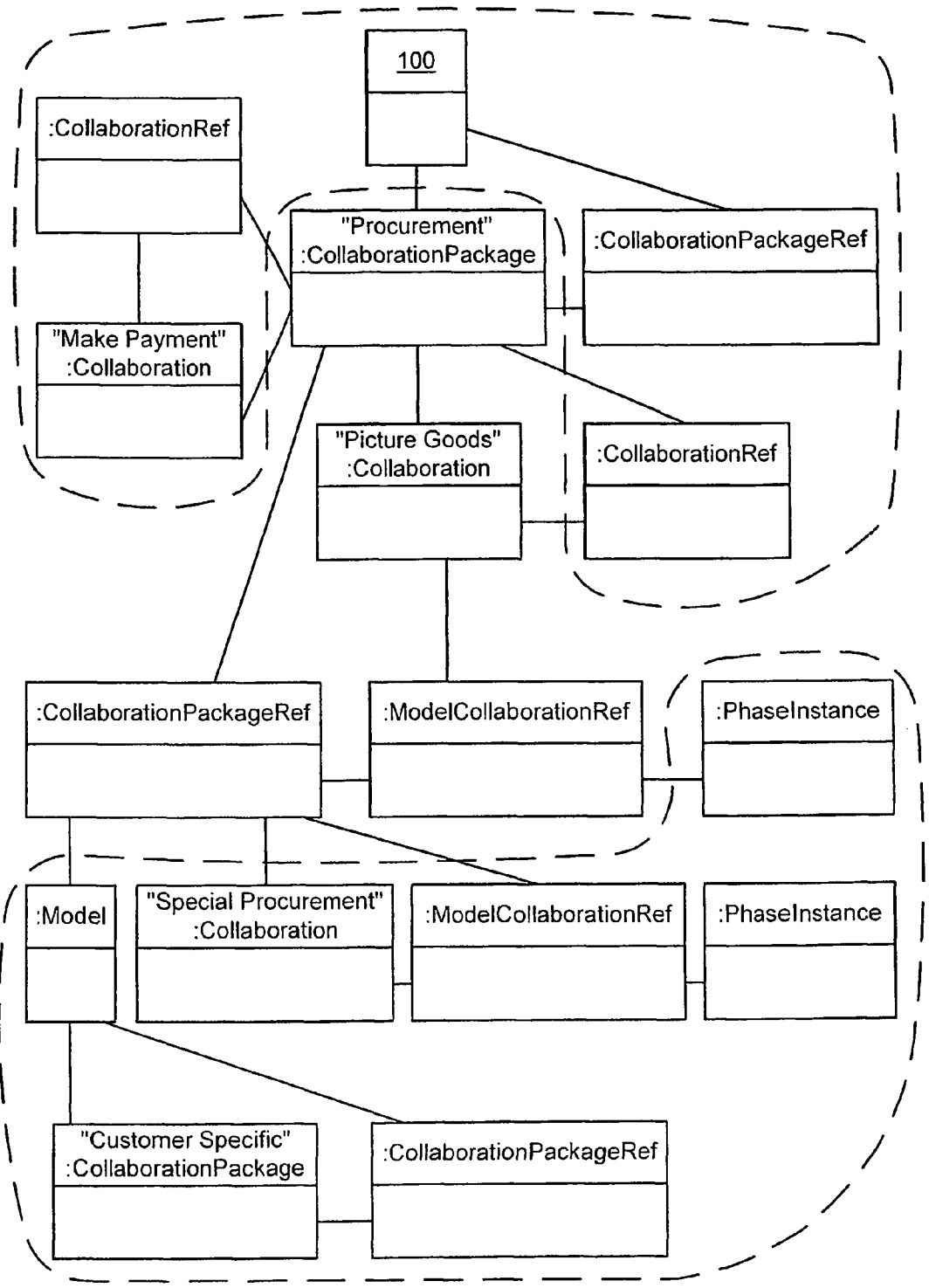
FIG. 3 is a diagram showing Include and Exclude patterns using a meta model.

The traceability link is modelled using the refinement relationship. It links an Action (step) to a Collaboration (use case), with the meaning that the Collaboration (use case) is a more detailed representation of the Action (step). Applying this relationship repeatedly allows one to navigate any depth of abstraction, including from business process models to software code. This mechanism is generalised in the representative implementation illustrated in FIG. 2, illustrating the section of the meta model which enables refinement. The Collaboration (use case) is a, representation of a business process at some level of abstraction. It has a single Effect, which is an optional Pre-condition and a required Post-condition. The Effect defines the changes the business process has on business entities. A Collaboration (use case) consists of a number of actions (steps) that represent the steps in the business process. Each Action (steps also has an Effect that describes what changes it causes in business entities. It is important to note therefore that Actions (steps) and Collaborations (use cases) are very similar—they both define changes in business entities. The only difference is that Collaborations (use cases) describe the steps involved in the changes and Actions (steps) do not. This allows one to say that Actions (steps) are abstract representations of Collaborations (use cases) (or alternatively Collaborations (use cases) are Actions (steps) that "expose their innards"). Now, if Actions (steps) are abstract representations of Collaborations (use cases), it is a relatively simple step to formally represent this relationship. This is achieved via the Refinement type. It links an Action (step) (via the ActionRef type) and a Collaboration (use case) and has the semantic that the Collaboration (use case) is a more detailed view of the Action (step). The Refinement type has an attribute called "type", which states what stage of the project life-cycle that the associated Collaboration (use case) is at (business analysis, system analysis, or design for example).

So, an Action (step) and a Collaboration (use case) can be associated via Refinement, and the semantic of the association is that the Collaboration (use case) is a more detailed view of the Action (step). In other words, the Collaboration (use case) has exactly the same Effect as the Action (step), but is modelled at a greater level of detail. This is what enables the traceability from business to code. Every refining Collaboration (use case) has to be a plug-in replacement for its abstract Action (step). This requirement is so important in fact that it needs to be enforced. This is achieved by the Justification type, described below. In summary, traceability is applied via refinement in the following ways:

Manage detail during Business Analysis—a refinement object of type "business" linking an Action (step) and a Collaboration (use case) states that the Collaboration (use case) is a more detailed view of the Action (step) but that both Action (step) and Collaboration (use case) express Business Analysis level detail.

Bridge Business Analysis and Systems Analysis—a refinement object of type "system" linking an Action (step) at Business Analysis level to a Collaboration (use case) states that the Collaboration (use case) is a System Analysis level representation of the Action (step).

Manage detail during System Analysis—a refinement object of type "system" linking an Action (step) at System Analysis level and a Collaboration (use case) states that the Collaboration (use case) is a more detailed view of the Action (step) but that both Action (step) and Collaboration (use case) express System Analysis level detail.

Bridge System Analysis and Design—a refinement object of type "design" linking an Action (step) at System Analysis level to a Collaboration (use case) states that the Collaboration (use case) is a Design level representation of the Action (step). Refinement is also used to trace into code, but that is treated as a separate pattern.

Reuse

This section presents the pattern that deals with the software problem of reuse. A number of reuse goals, as described below, are realised:
1. Reuse across the software life-cycle.
2. Intra-model reuse.
3. "Proactive" reuse.

Each type of reuse is dealt with below.

Reuse Across the Software Life-Cycle

To take the example of a customer that is looking for a procurement site. The developers have completed a project that has a requirement in common with this new one. The common requirement is "Procure Goods". Additionally the customer has a requirement for a business process called "Special Procurement" and other functionality called "Customer Specific". Re-use applies to the earlier life-cycle stages as well as it does to construction. Every Internet site requires authentication and session management. Every B2C site requires Catalog Management, even if not obviously. Every B2B site, using the strict definition of B2B, requires exchange of business documents between businesses. Reuse also applies to the requirements stage of the life-cycle, to system requirements, software and network architecture and navigation mechanisms—the entire software life-cycle infact.

In accordance with at least preferred embodiments of the invention, the goal of a life-cycle is regarded as a process by which business requirements are continuously and traceably refined to a more software-like form until they actually are software. This interpretation allows one to combine the notions of process and reusable assets in a very interesting and powerful way; any given reusable asset can be a more software-like representation of another reusable asset and as such represents a step along the software life cycle. This means that reusable assets linked in this way form a map that begins at business requirements and ends in code. Enabling reuse across the life-cycle makes use of two mechanisms; refinement to provide traceability through the life cycle (as described above) and the asset repository. The asset repository is a repository of reusable content that spans the software life cycle. It includes business models that are refined into system models that are refined into design models that are refined into software components. Every element in the asset repository is made as generic as possible so it can be included in many customer-specific models.

A user can nominate elements from the asset repository for inclusion in his project. He can also extend the content he has included from the asset repository. This mechanism is known as the "Include and Extend Pattern". The diagram of FIG. 3 helps to illustrate. At the top of this diagram is an asset that contains a single Collaboration (use case) Package "Procurement". That package contains two collaborations (use cases): "Procure Goods" and "Make Payment". "Procure Goods" is the reusable Collaboration (use case) mentioned in the example above. There is a model towards the bottom of the diagram. A model represents a project for a particular customer. This particular model needs to reference the reusable "Procure Goods" Collaboration (use case) in the Asset repository 100. It does so by first of all including a reference to the package that contains the reusable collaboration (use case). This is achieved by the CollaborationPackageRef called "refl" which points to the required Collaboration (use case) Package in the asset repository 100. "refl" contains a ModelCollaborationRef called "mrefl" that refers to the required reusable Collaboration (use case) in the Asset repository 100. This has included the reusable Asset repository content in the Model. The content can be extended since it is referred to indirectly by the ModelCollaborationRef instance. This instance can have other instances and content associated with it. In this case it has a PhaseInstance instance associated with it. Additionally, the "Procurement" package included in the Model from the Asset repository 100 can be extended, since it is included by reference. In this example, the referring object, "refl", has a second Collaboration (use case) added to it—"Special Procurement". This addition is made without affecting the content in the asset repository 100. In a sense, this content is "layered" over the asset repository 100 content. As a further illustration of the independence of the Model from the asset repository 100, the Model has a second CollaborationPackage, "Customer Specific" that is purely local to it. It can be shown that the refinement mechanism described above applies to content included from the asset repository 100. This allows model builders to include a Collaboration (use case) from the Asset repository and make it more specific via Refinement. For example, the model builder might include a Collaboration (use case) called "Make Payment" that includes an Action (step) called "Transfer Funds". The model builder can add a refinement to the "Transfer Funds" Action (step) to support customer specific transfer funds mechanisms—"Transfer Funds by EFT" for example.

Figure 4:
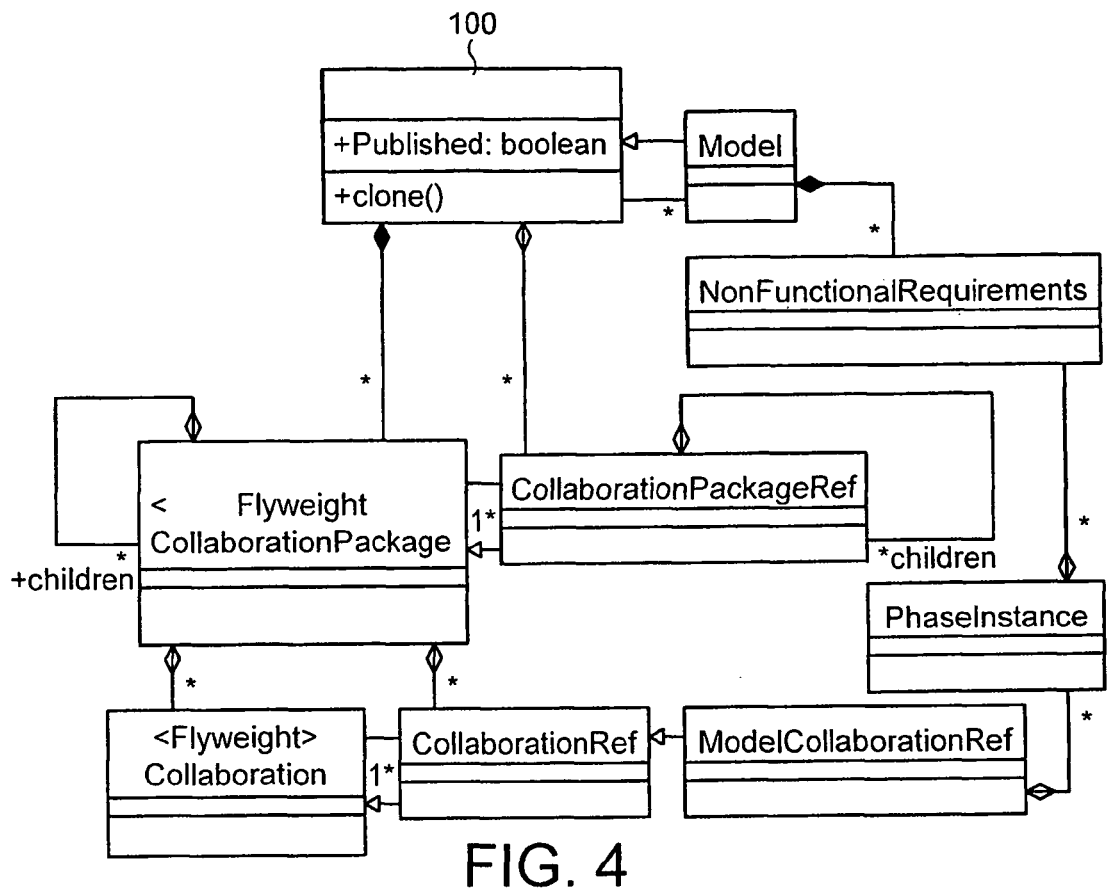
FIG. 4 is a diagram showing Include and Extend patterns in the meta model.
Figure 5:
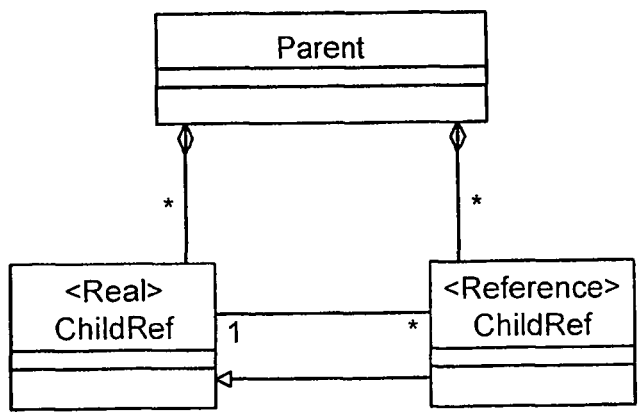
FIG. 5 is a diagram showing the Include pattern.
Figure 6:
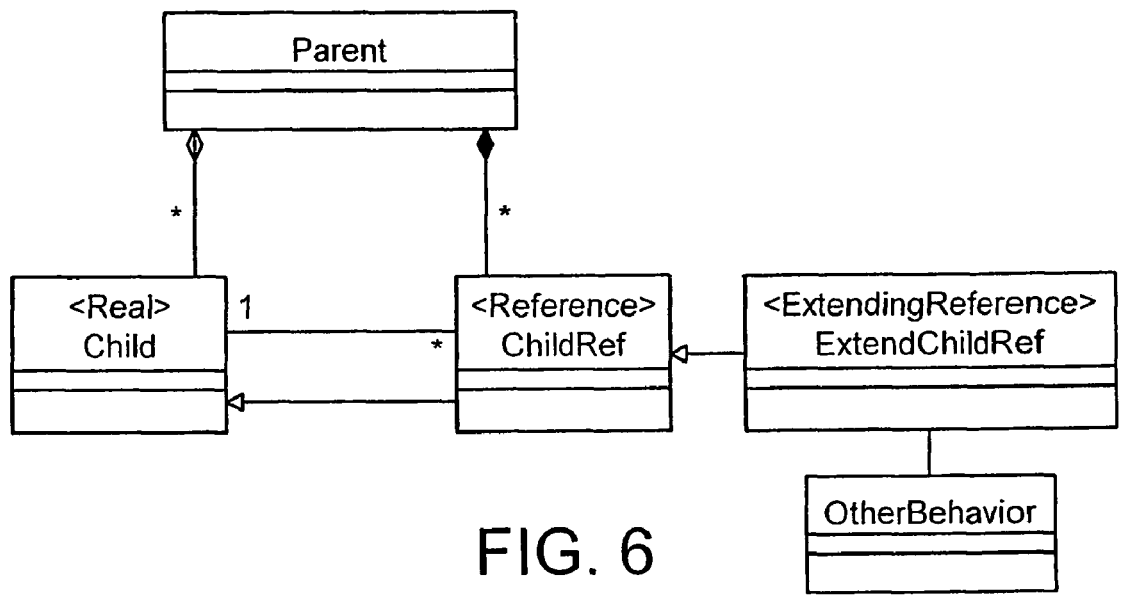
FIG. 6 is a diagram showing an Extend pattern.

The diagram of FIG. 4 shows the section of the meta model that enables the "Include and Extend Pattern". The include and extend pattern is best explained-by looking at the mechanism of inclusion and extension separately. Any content that has to be included in a model from an asset repository 100 is represented by two types. One is the content itself, the other is a reference to the content (in terms of FIG. 4, the content is represented by the type called "CollaborationPackage", which is a package of pure use cases and the reference type is "CollaborationPackageRef", which is a reference to such a package and contains the context attributes).

References inherit from real types—they are the real types and more. The "more" bit is that they may refer to a real type and delegate to it while still retaining the ability to act exactly like the real type. For example, a CollaborationPackageRef will refer to a single CollaborationPackage (use case package). However, it can also contain Collaborations (use cases), as if it was the real type itself.

Real content is always navigated to via the reference types. This enables one to ignore where real content is located—the real content might share the same parent as the reference type, or it might be in some totally different parent. So inclusion is supported. The only question left to be answered is where to locate the real content. The rule here is to always locate it where it is first created. For example, the real collaboration (use case) "Procure Goods" is located in the "Procurement" package in the Asset repository. This is because the Asset repository editor first created the collaboration (use case) in the content of that package. Additionally, the CollaborationPackage "Customer Specific" is located in the Model, because this is where the Model builder first created it. Therefore, inclusion is supported using the pattern shown in FIG. 5. In this diagram, the types that represent real content are known as "Real" and the types that refer to content, and contain contexts attributes, are known as "Reference".

Extension builds on the Include pattern by introducing special cases of reference types. In terms of the diagram of FIG. 4, ModelCollaborationRef is a special case of a reference type. It inherits from a Reference type and defines new behaviour to achieve extension. In this case it adds a PhaseInstance object. So this is the rule for extension of included content: create a type that inherits from the relevant Reference type and define the extending behaviour. Such extending types are known as "ExtendingReferences". So, extension is supported using the pattern illustrated in FIG. 6:

The Include and Extend Pattern in the meta model is used for the following applications:

Inclusion of Collaboration (use case) Packages in Models
Inclusion of Collaborations (use cases) in Models
Inclusion of Actions (steps) in Models
Inclusion of Actors and Types in Models
Extension of included Collaboration (use case) Packages (by addition of Collaborations (use cases))
Refinement of included Collaborations (use cases)
Sharing of Types and Actors—in the asset repository 100, in models and between the asset repository 100 and models.

Intra-Model Reuse

A business model uses business processes and entities in numerous contexts. For example, the business process "Make Payment" may be used in a business model to pay for received goods, issue a refund or award a prize. Regardless of the business context that the process is used in, its effect is still the same: money passes from payer to payee. So, the problem is how to realise this reuse opportunity.

Figure 7:
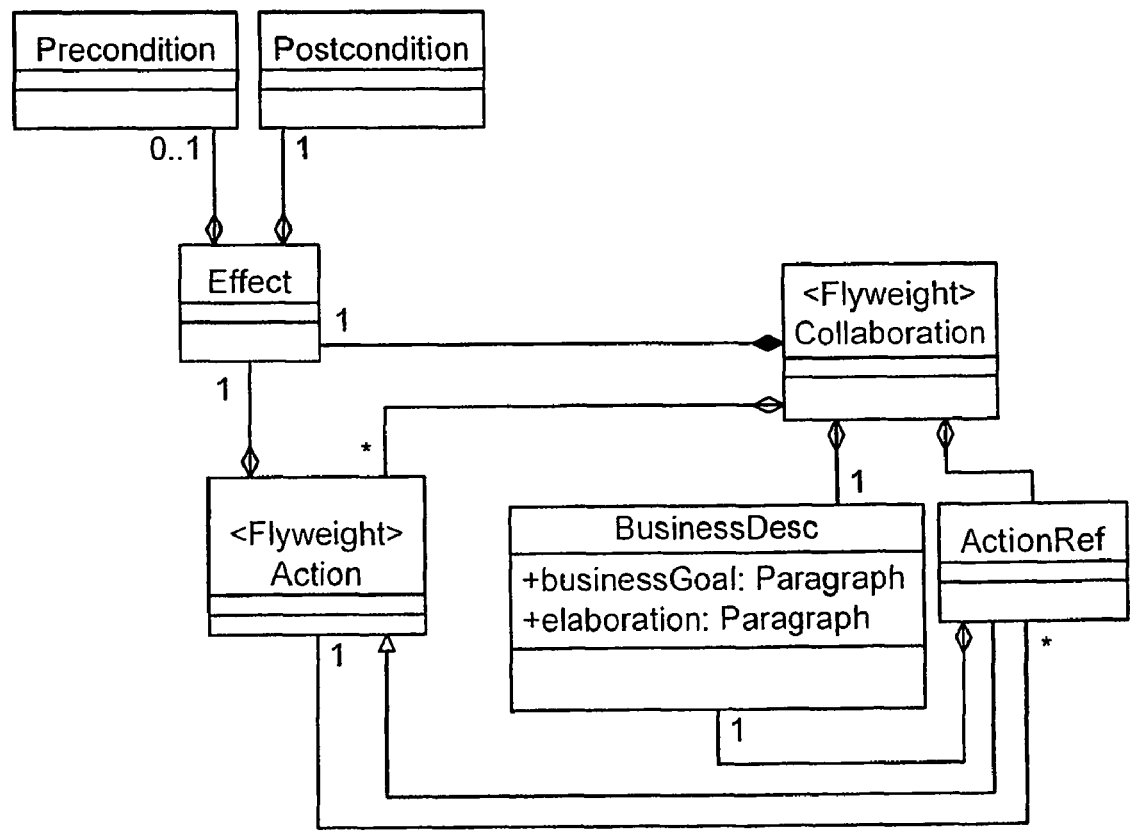
FIG. 7 is a diagram showing action re-use in the meta model.
Figure 8:
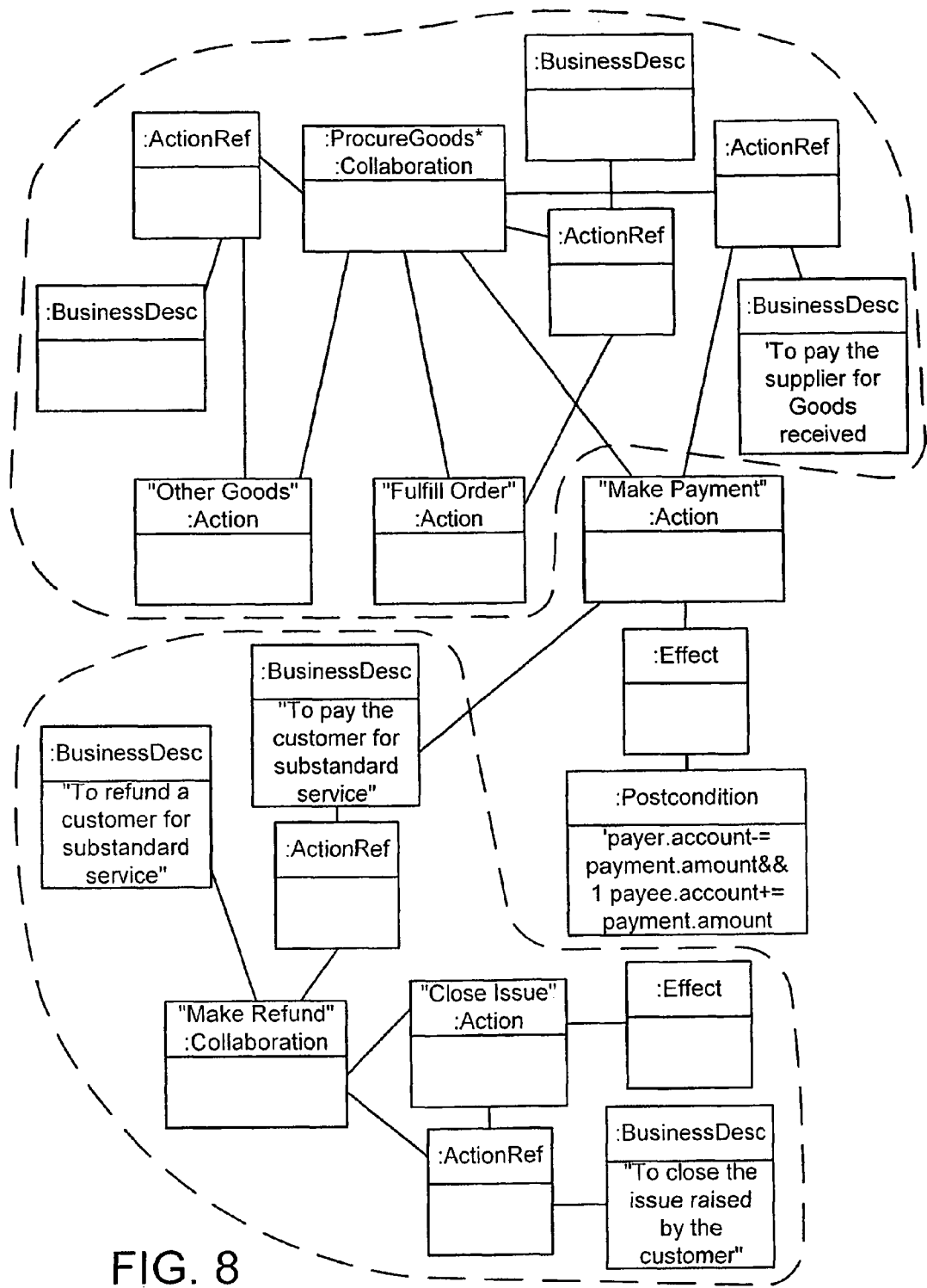
FIG. 8 is a diagram showing action re-use using the meta model.

The meta model realises this reuse opportunity by separating the effect of a business process and its business context. The effect is modelled using an Action (step), which captures the business entities and what happens to them during the business process. The business context is modelled using a Business Description, which captures what the process means to the business. To enable inclusion of an Action (step) in many Collaborations (use cases), Actions (steps) are always navigated to via ActionRef objects. An ActionRef may refer to an Action (step) that is contained by its parent Collaboration (use case) or it may refer to an Action (step) that is contained in some other Collaboration (use case). The question then is where to locate Actions (steps). The rule is that Actions (steps) are always placed in the Collaboration (use case) in which they are created and referred to via an ActionRef. This mechanism is called the include and extend Pattern and is applied through the meta model to allow intra-model reuse of Actions (steps), as described here, and also Types and Actors. The diagram of FIG. 7 shows the section of the meta model that enables intra-model reuse. The Collaboration (use case) is a business process that has a purpose in a given business. This purpose is represented using a BusinessDesc object. The Collaboration (use case) describes the steps involved in the business process it represents by referring, via ActionRef objects, to any number of Action (step) objects that describes a discrete change of state in a number of business entities. The sum of these changes of state realise the Collaboration (use case) change of state (Effect). However, every ActionRef adds a business reason for the Action (step) that it refers to. This business reason is independent of Action (step), thereby enabling reuse of Actions (steps) in many business contexts. The diagram of FIG. 8 illustrates. FIG. 8 shows one Collaboration (se case) "Procure Goods" that contains an Action (step) called "Make Payment". That Action (step) is used for the business reason for paying a supplier for goods received. There is a second Collaboration (use case) "Make Refund" that also uses the "Make Payment" action (step) in the first Collaboration (use case). But this second Collaboration (use case) uses it for the different business reason to refund a customer for substandard services.

Thus the embodiment described hereinabove provides for Sharing of Actions (steps)—in the asset repository 100, in models and between the asset repository 100 and models.

Proactive Reuse

The typical approach to acquiring reusable assets is to retrospectively harvest them from completed projects. There is a problem with this approach in that it is applicable only on projects that are quite similar to previous projects. This makes it difficult to move into a new business area and retain the benefits of a reuse strategy. The ability to quickly move into new business areas is critical for any software organisation, especially those involved in the dynamic business of e-business solution provision.

The present embodiment provides a division, called the Content Group, that proactively creates reusable artifacts for given businesses and disseminates them through the asset repository 100. The Content Group can be instructed to create assets in selected businesses. The group will actively pursue that task while the sales force is winning business. The Content Group will create new assets and may re-factor existing assets to make them more suitable for the given business domain. When a contract is won and a project becomes live, project team members can leverage the assets that the Content Group has already generated.

Thus the embodiment described hereinabove provides for proactive reuse—proactively generating high quality models for business domains that are strategic.

Technology Mapping

Once the customer has signed off requirements, technology must be selected to realise them. Some of this technology will be off-the-shelf software; and some of it will be customised development. The problem is choosing the right technology for the customer's requirements.

An important thing to note about the meta model is that it uses a uniform modelling methodology from business to code. Business processes are represented as changes in the state of business entities via their Effect object. The same mechanism is used to capture business processes that are modelled at the system level. And the same process can be used to model software components. A software component has an effect in the same way as the highly abstract process has, except that the former speaks in terms of software entities. This enables one to leverage the refinement mechanism to map requirements to software components. The components can be Sun™, Microsoft™ or any other component type. Alternatively they can be notional components that capture the effect of non-componentised software entity. What this means is that once a customer has selected their requirements, one can look at the technologies that implement their requirements and make recommendations accordingly. In other words, the system advises on what technologies one needs to implement the system.

Thus the embodiment described hereinabove achieves Technology Mapping—by leveraging the mechanism of refinement, business requirements can be associated with the technologies that implement them.

Justification

The refinement mechanism realises traceability, as described above. It enables association of an Action (step) and a Collaboration (use case) with the semantic that the Collaboration (use case) is a more detailed representation of the Action (step), and as such represents a step along the software life-cycle. But how does one prove that this statement is correct? Therefore, it is important to apply rigor to the refinement relationship such that the refining Collaboration (use case) is demonstrably equivalent to the abstract Action (step).

Figure 9:
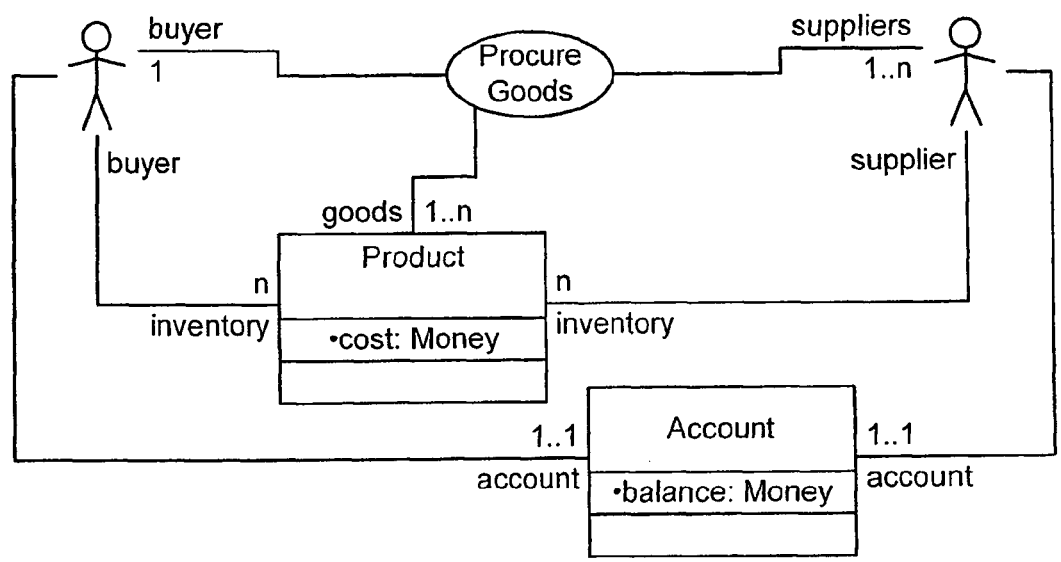
FIG. 9 is a diagram illustrating a "Procure Goods" Action.
Figure 10:
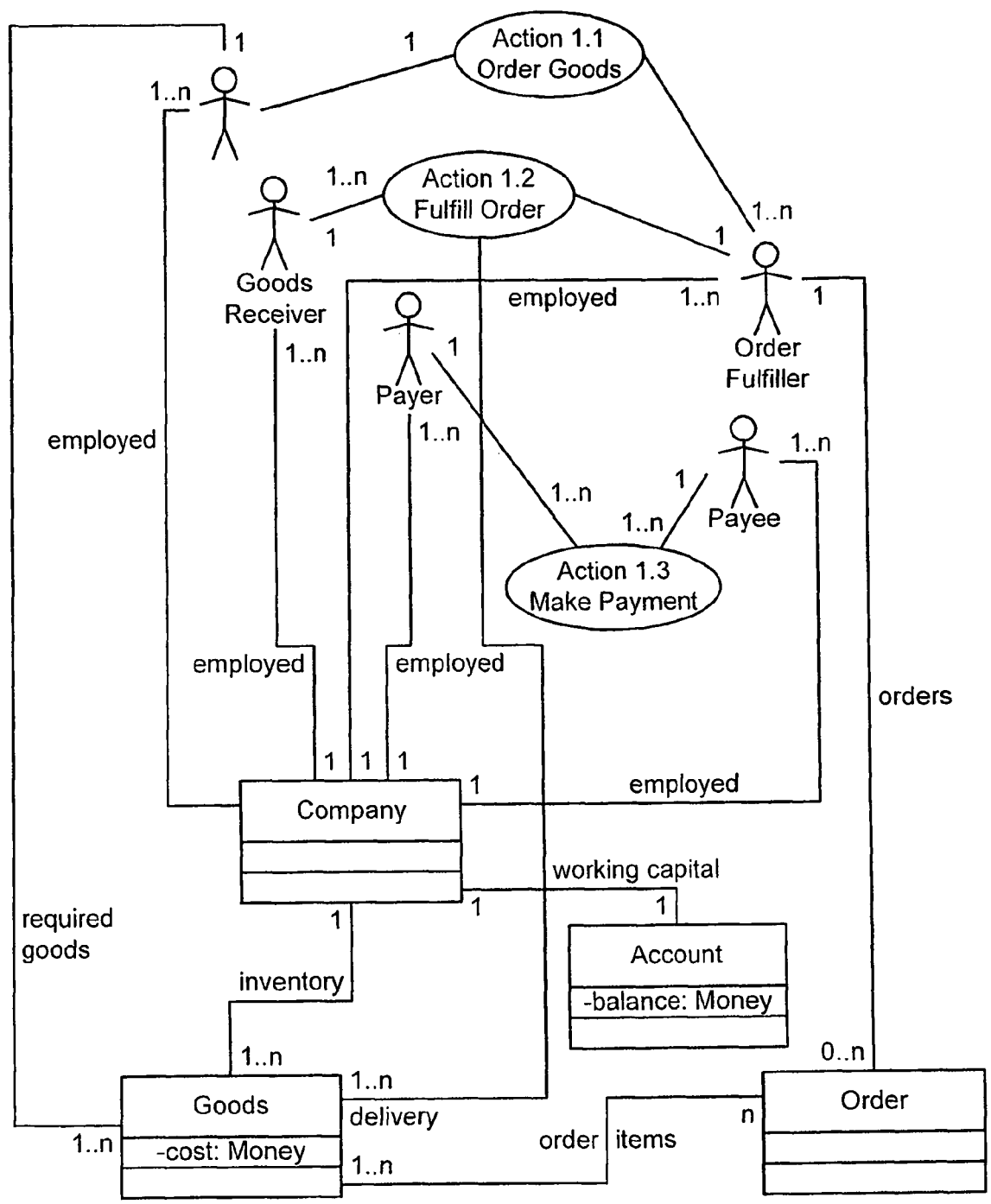
FIG. 10 is a diagram illustrating a "Procure Goods" Collaboration.

The present embodiment addresses this problem as described with reference to FIG. 9. In this situation, there are no pre-conditions. The post-condition is that the buyer owns the Goods and the Supplier has been paid for them. This is equivalent to a more detailed Collaboration (use case) illustrated in FIG. 10. In this situation, there are no pre-conditions and the post-condition is that the Buying Company owns the Goods and the Supplying Company has been paid for them. The solution to this problem is enabled by the introduction of the mechanism of Justification. Every refinement has an associated Justification that states how the abstract Action (step) is realised by the refining Collaboration (use case). There are three types of justification.

1. The first, Predicate Justification, is the most rigorous as it can be made subject to machine validation. It states how each clause in the Action's (step's) precondition expression is realized by a clause (or a set of clauses) in the Collaboration (use case) precondition. The same applies for the post-condition.

2. Diagrammatic Justification contains UML relationships that show how entities involved in the abstract Action (step) are realised in the refining Collaboration (use case).

3. Verbal Justification is the least rigorous justification mechanism as it consists purely of an explanation in English (or whatever language) how the abstract entities are realized in the refinement.

Figure 11:
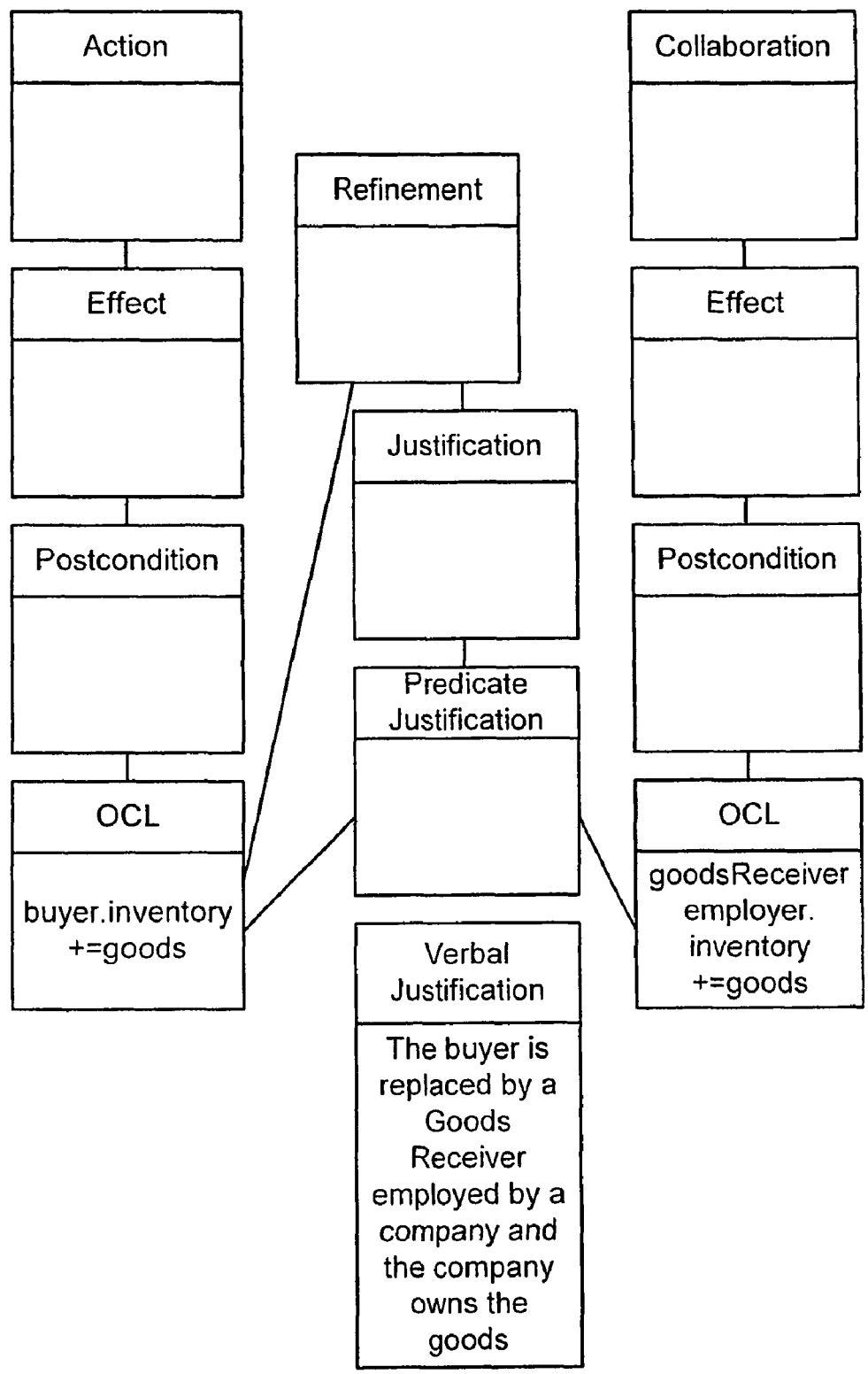
FIG. 11 is a diagram showing a Predicate Justification snapshot.
Figure 12:
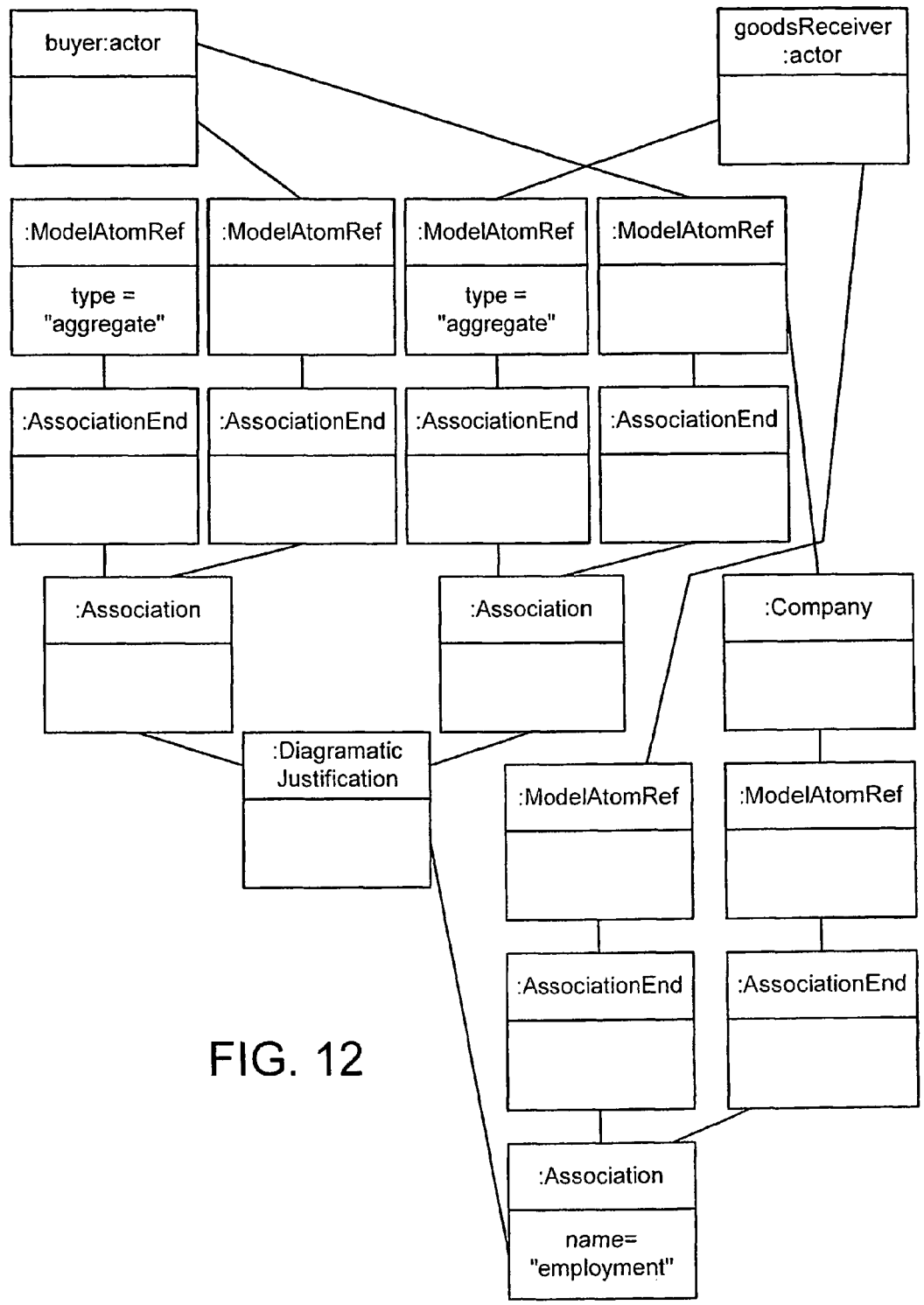
FIG. 12 is a diagram showing a Justification snapshot.

Each justification type is illustrated by snapshot diagrams, and referring to FIG. 11 a Predicate Justification diagram is shown. Predicates based on Object Constraint Language (OCL) can be justified using Predicate Justifications. Assume there is an Action (step) whose post-condition is "buyer inventory+=goods" and there is a refinement of that Action (step) that has the post-condition "goodsReceiver.employer-.inventory+=goods". The snapshot diagram for this case is illustrated in FIG. 11. In this diagram, the Predicate Justification links two predicates and explains verbally how they are equivalent. Assume there is an Action (step) that involves an Actor called "buyer" and that this Action (step) is refined by a Collaboration (use case) that replaces the notion of "buyer" with an Actor called "goodsReceiver" and a type called "Company" and the goodsReceiver is employed by the Company. The snapshot diagram for this case is presented in FIG. 12. This snapshot states that the Actor called "buyer" is the same as an Actor called "goodsReceiver" that is employed by a company. This is achieved through the Diagrammatic Justification instance—bottomcentre. It has three associations. The leftmost one states that the "buyer" Actor has an aggregate relationship with the "goodsReceiver" Actor. This means that the "buyer" consists of the "goodsReceiver". The middle association states that the "buyer" Actor has an aggregate relationship with the Company instance. The rightmost association states that there is a relationship between the "goodsReceiver" Actor and the Company and that this association is known as "employment".

Figure 13:
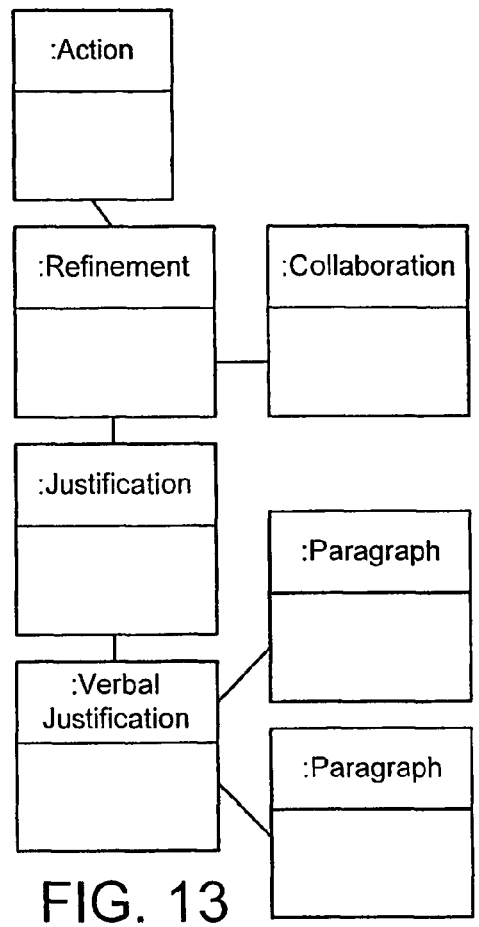
FIG. 13 is a diagram showing a Verbal Justification snapshot.
Figure 14:
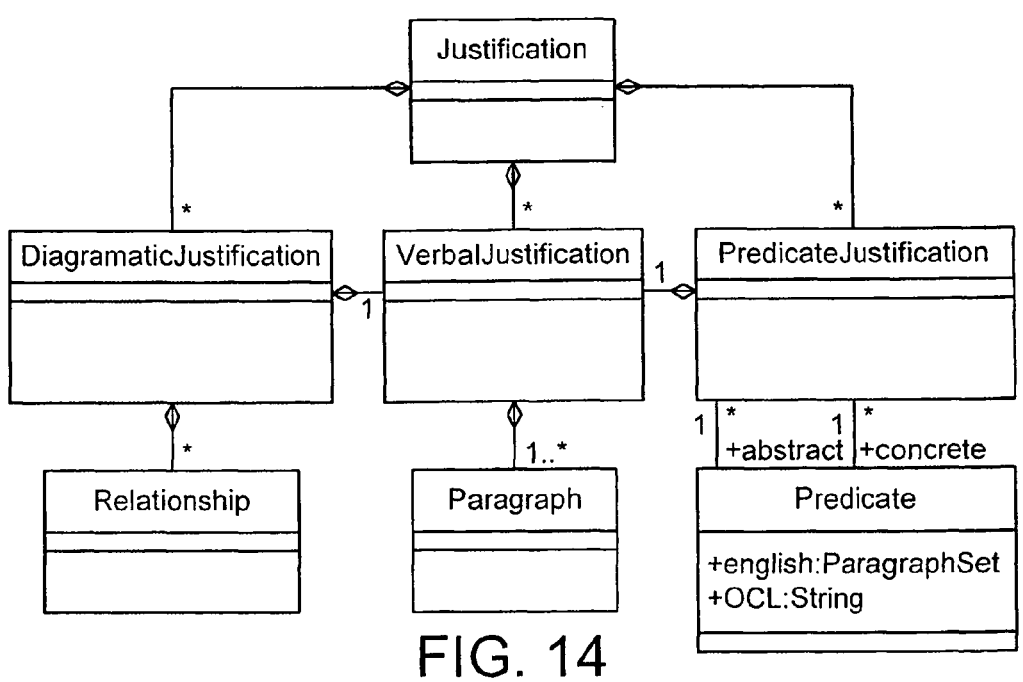
FIG. 14 is a diagram showing Justification generally in the meta model.

A Verbal Justification is a series of paragraphs of text that explain in English how the entities in the abstract Action (step) involved in a refinement are realised in the refining Collaboration (use case). The snapshot diagram of FIG. 13 illustrates this, and the diagram of FIG. 14 shows the section of the meta model that enables justification. A Justification consists of any number of DiagrammaticJustifications, VerbalJustifications and PredicateJustifications.

Thus, the embodiment described hereinabove applies rigor to traceability—by requiring that refinements; are justified, the justification processes forces the developer to think about and make explicit the relationships between abstract Actions (steps) and the refining Collaborations (use cases). Additionally, the presence of this information guides the reader through the levels of abstraction and makes traceability explicit.

A further embodiment is described with reference to FIGS. 15 to 19. As in the foregoing description, the term "Collaboration" may be taken to be interchangeable with the term "use case". Furthermore the term "Action" may be taken to be interchangeable with the term "step" or "task step". No inference is to be drawn by use of the latter term rather than the former.

Any features not described in relation to FIGS. 15 to 19 should be taken to be the same as the corresponding features described with reference to FIGS. 1 to 14.

Figure 15:
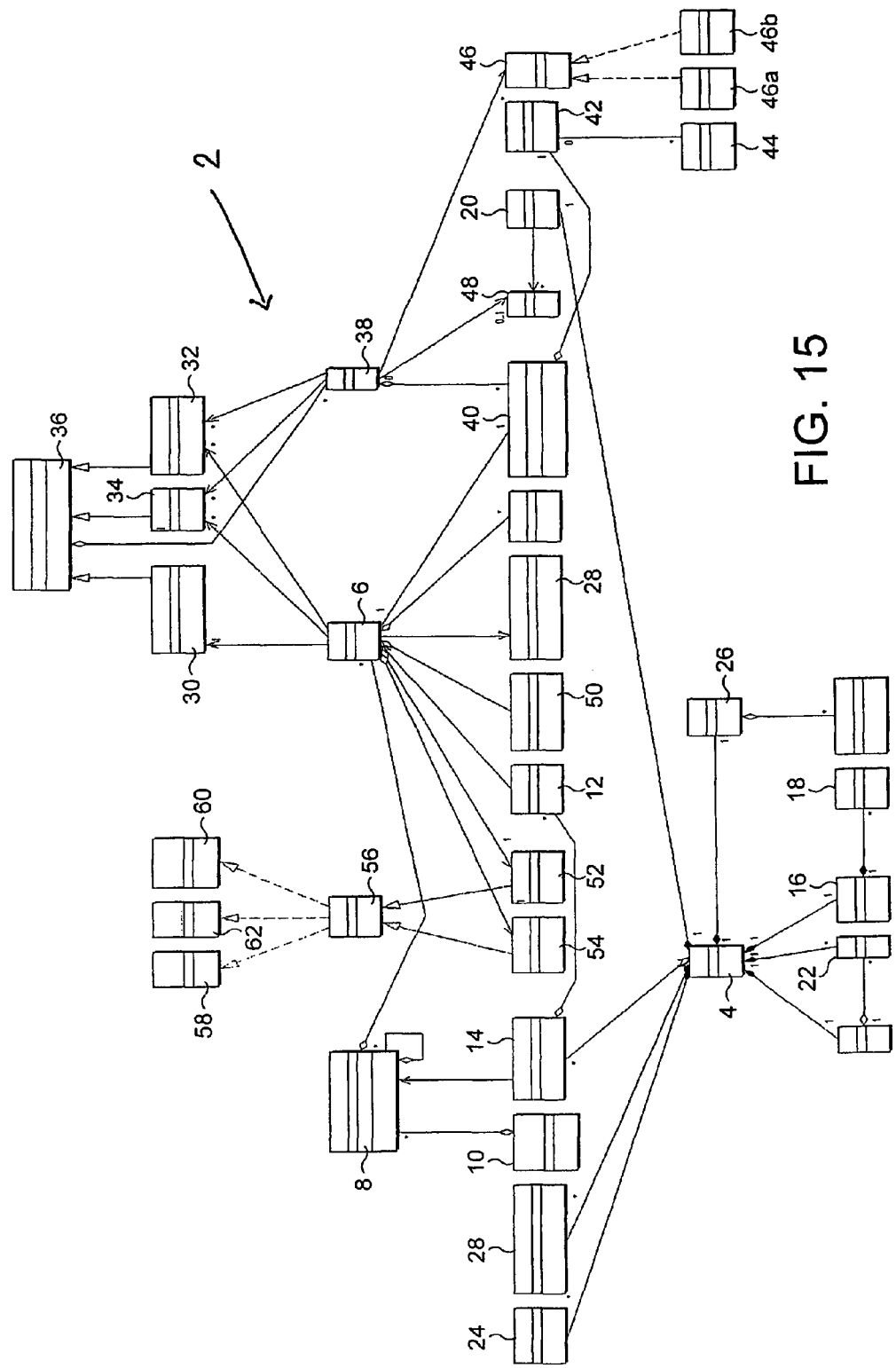
FIG. 15 is a class diagram of a meta model in accordance with another embodiment of the invention.

FIG. 15 shows the meta model 2 of a further embodiment of the invention in the form of a mete model class diagram. The meta model 2 is the schema by which the content of the model is structured. The various parts thereof are described with reference to FIGS. 16 to 18 from which they may be seen more clearly and thus are not described with reference to FIG. 15.

Figure 16:
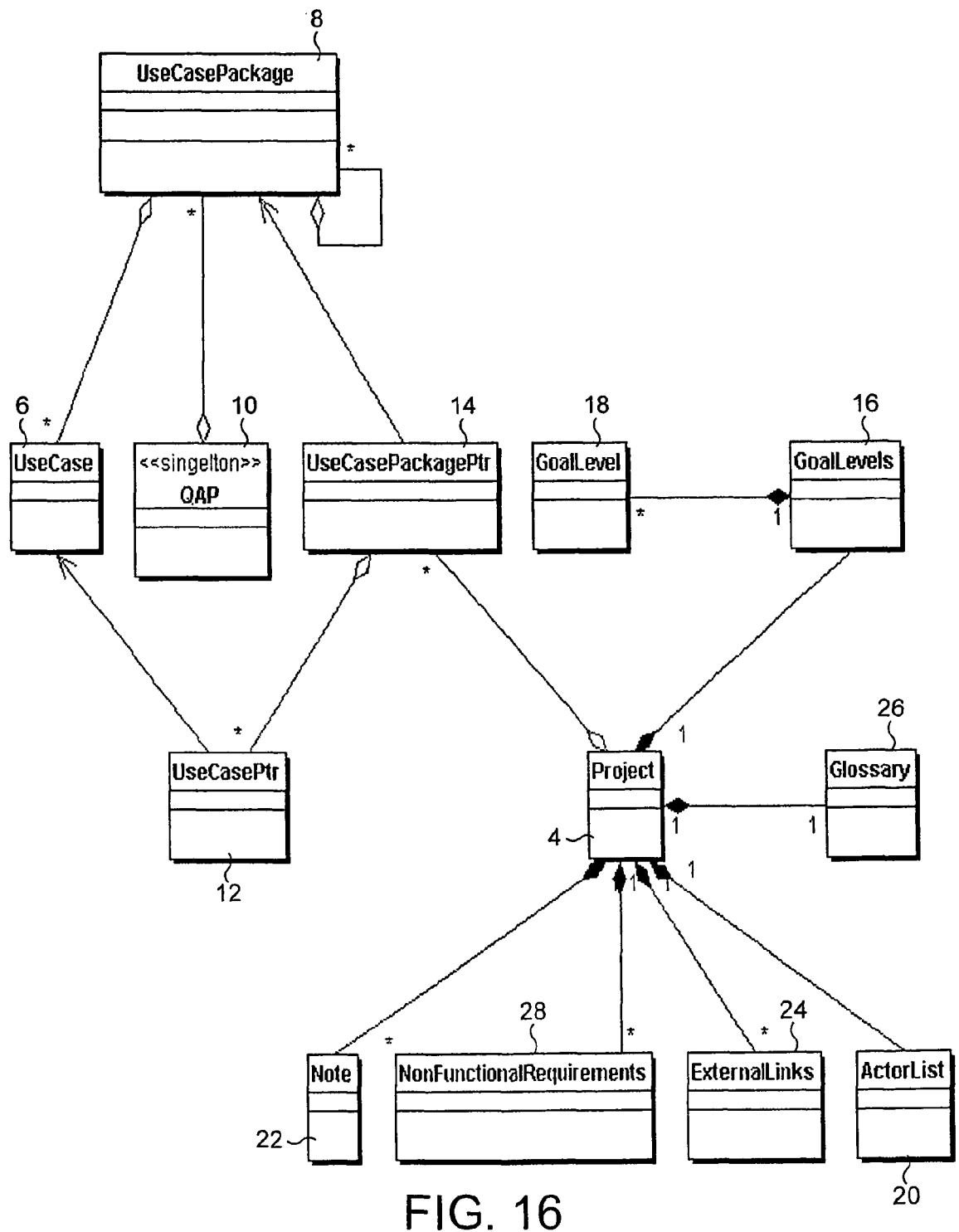
FIGS. 16 to 18 are more detailed views of the mea model of FIG. 15.

The relationship between a project 4 and use cases 6 is shown in FIG. 16. The project 4 contains all the components that model a real system—i.e. it represents software which has been developed or is being developed in accordance with a method and tool embodying the invention.

The use cases 6 are an arrangement of related steps to achieve some business goal. Use case packages 8 are the named containers of use cases 6. They may in turn contain other use case packages 8. Use case packages 8 allow for the logical or conceptual grouping of associated use cases.

The root node of the meta model is a qualified asset pool (QAP) 10. The QAP 10 comprises use case packages 8, which in turn contain use cases 6, which have been modified or purified and approved by an asset purifier team.

Use case pointers 12 are pointers to real use cases 6, which may be created in the current project 4 or a 'read only' link to a reusable use case in another project. Similarly, use case package pointers 14 are pointers to real use cases packages 8, which may be created in the current project 4 or a 'read only' link to a reusable use case package in another project.

The project 4 has a collection 16 of goal levels 18. The goal levels 18 are a process specific representation of what >level=a use case 6 can be demoted as. By default the described embodiment specifies five such goal levels: "very high summary"; "summary"; "user goal"; "sub-function"; and "too low".

A list 20 of actors, i.e. entities with which the project 4 may interact, is stored with the project. Also stored with the project 4 are freeform notes 22, a list 24 of links between the project and external systems, a glossary 26 of the terms used in the project and a list 28 of non-functional requirements. These are requirements that must be met by the project as a whole but which do not translate into functionality. Examples of non-functional requirements are "we must be able to process a hundred transactions a second", or "the user interface must be usable". Although not shown in FIG. 16, non-functional requirements may also be associated with individual use cases.

Figure 17:
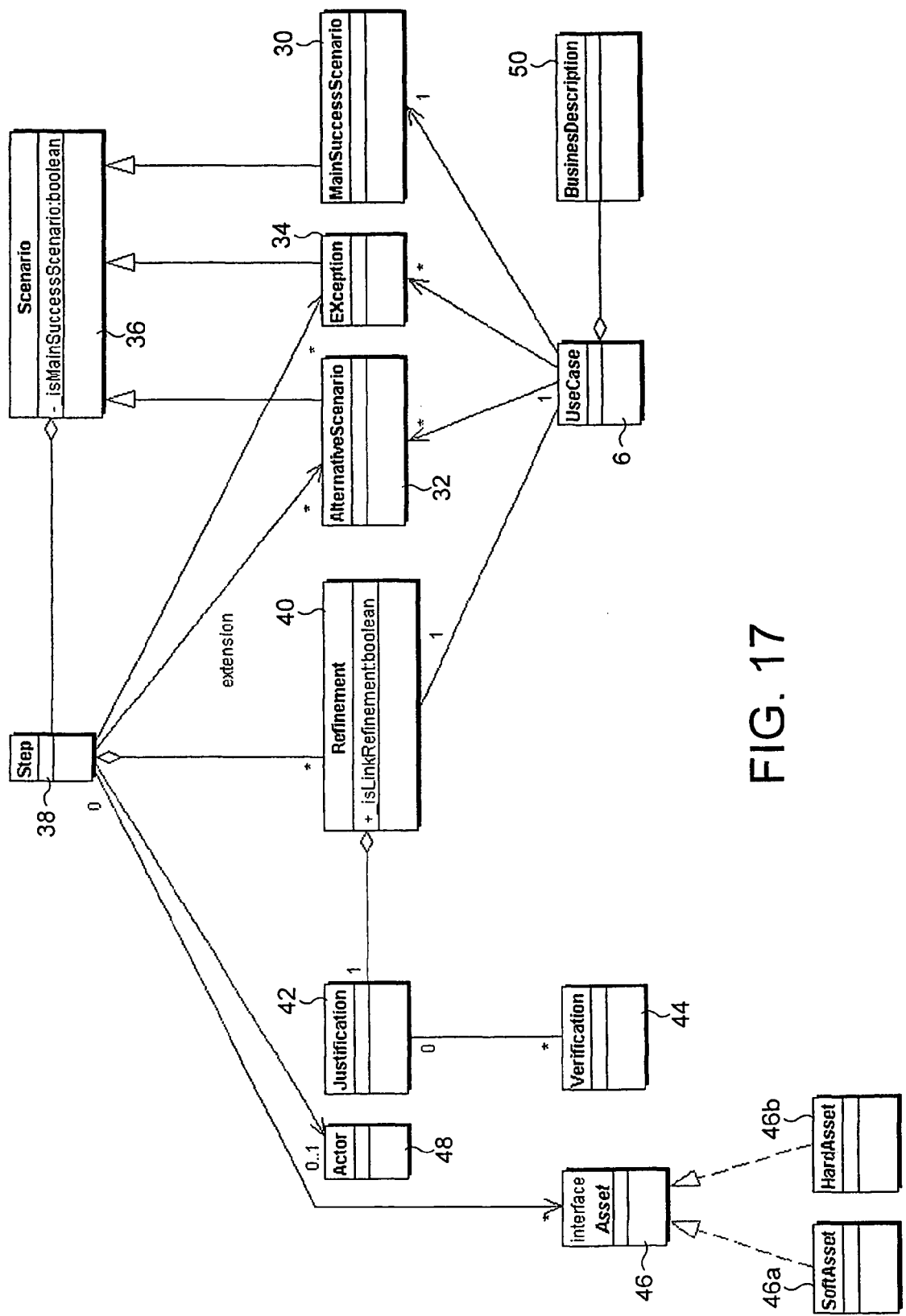

Further details of the meta model 2 may be seen in FIG. 17. It will be seen that each use case 6 has one main success scenario 30 and may also have one or more alternative scenarios 32. Additionally a use case 6 may have one or more exceptions 34. An exception(s) 34 handle(s) the case(s) in which the effect of the associated Step will not happen. An exception 34 has a single pre-condition object that states the condition under which the exception 34 will execute. The exception 34 will also have an associated use case that shows how to deal with the exceptional condition.

A scenario 30, 32, 34 (represented collectively by the scenario object 36) has, in general one or more steps 38 within the scenario 36. The steps are linked to use case 6 by means of a refinement 40. This is the nature of the recursive structure in accordance with the invention: a step 38 may be refined by a refinement 40 to give a use case 6, a more detailed but equivalent description of the step 38; the use case has scenarios 36; scenarios contain, in general, a number of steps 38; each of these steps 38 may themselves be refined to a yet more detailed use case 6 etc.

Each refinement 40 has a justification 42. The justification 42 demonstrates how the resultant effect of a use case 6 (or more accurately the main success scenario 30 thereof) is equivalent to that of the parent step 38. The justification 42 thus provides traceability between the abstract step 38 and the use case 6 that is a more concrete representation of it. The justification may be formal or informal and may have an optional verification 44. Verification 44 proves that the resultant-effect of the abstract and refined views are the same. Verification 44 could be casual, rigorous, mathematical etc.

An asset 46 is a piece of work in a business context which is capable of fulfilling the resultant effect of a step 38 exactly. Typically assets 46 are only associated with detailed refined use cases 6. Assets can be soft 46a, e.g. documents, html pages etc., or hard 46b, e.g. computer code.

As described above, actors 48 are entities that participate in one or more steps 38. Finally, a business description 50, that is a textual explanation of a business action being carried out by a use case 6, may be recorded.

Figure 18:
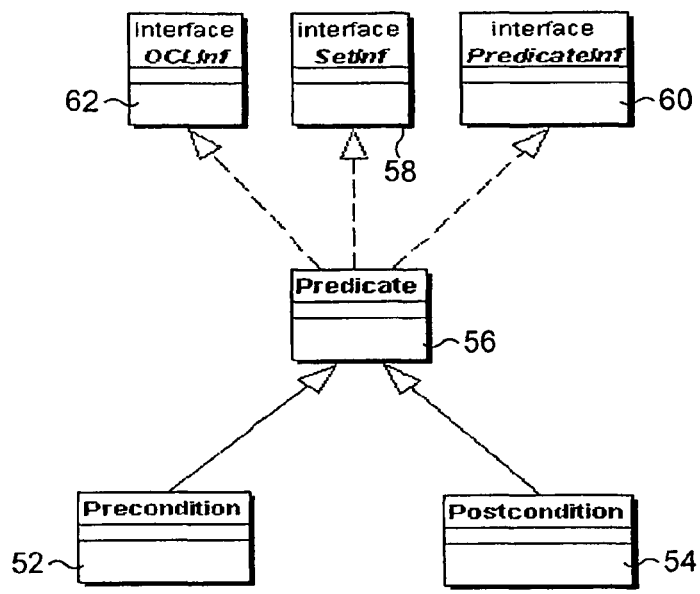

FIG. 18 describes the role of pre- and post-conditions. A pre-condition 52 defines the situation in which a step 38 (FIG. 17) can start—i.e. it must be true before the step may take place. A post-condition 54 must be true when the step has been performed i.e. it must equal the resultant effect of the further steps of the main success scenario of the use case which is a refinement of the step.

The predicate object 54 fully supports predicate logic usage by implementing Object Constraint Language (OCL) which is part of the Unified Modelling Language specification of the Object Management Group; Sets and Predicate basics. This forms the basis for OCL used in pre and post-conditions.

The Set interface 58 defines the mathematical Set logic. The Predicate interface 60 defines the mathematical predicate logic. The OCL interface 62 defines the OCL exactly as specified in the Unified Modelling Language specification of the Object Management Group.

Figure 19:
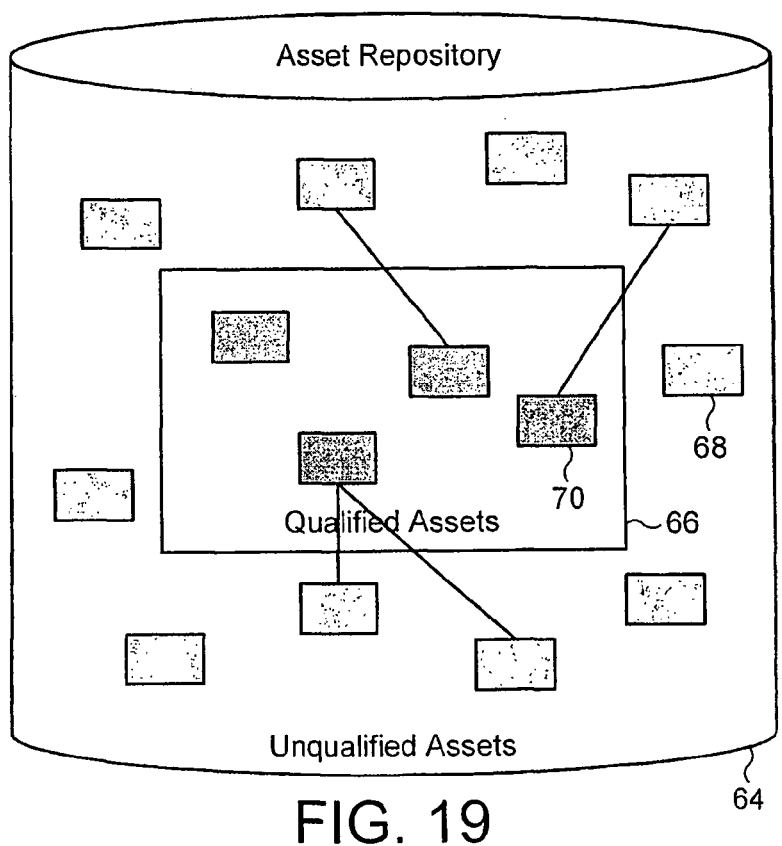
FIG. 19 is a schematic diagram demonstrating the use of a qualified asset pool.

Finally FIG. 19 is a schematic view of the asset repository. This diagram demonstrates that the software development tool comprises an asset repository 64 which includes a separate Qualified Asset Pool (QAP) 66. The asset repository 64 in general contains unqualified assets 68, whilst the QAP 66 contains qualified assets 70. These are assets which have been 'purified' by removing any context or project specific information to allow their reuse across other projects.

It will be appreciated by those skilled in the art that whilst certain preferred embodiments of the present invention have been described, many modifications and variations may be made within the scope of the present invention.

The invention claimed is:

1. A method executed by a computer for developing software capable of performing a task, the task comprising a task step required to perform the task, the task step having a resultant effect and determining one or more changes in business entities, wherein the method comprises:
   recording a use case comprising one or more scenarios, the or each scenario comprising one or more further steps, wherein the use case is a representation of the task step associated with determining the one or more changes in the business entities;
   recording a refinement relationship between the task step and the use case, the refinement relationship having an associated justification stating how the task step is realized by the use case;
   recording the scenario or one of the scenarios as a main success scenario such that a resultant effect of the main success scenario is the same as the resultant effect of the task step;
   determining that the resultant effect of the task step is the same as the resultant effect of the main success scenario by using one or more justifications; and
   qualifying the use case by removing context-specific information, wherein context-specific information includes one or more attributes of the use case that are associated with an environment in which the use case is used.

2. The method as claimed in claim 1 wherein the use case is a reusable use case and the method further comprises recording a reference to the reusable use case stored elsewhere.

3. The method as claimed in claim 2 wherein the reusable use case is stored without context-specific information.

4. The method as claimed in claim 1 wherein the use case comprises, in addition to the main success scenario, one or more alternative scenarios.

5. The method as claimed in claim 1 wherein the use case has a required post-condition.

6. The method as claimed in claim 1 wherein the use case has a required post-condition, the use case being applied only to the main success scenario.

7. The method as claimed in claim 1 wherein the use case comprises a pre-condition.

8. A method executed by a computer for developing software capable of performing a task, the task comprising a task step required to perform the task, the task step having a resultant effect and determining one or more changes in business entities, wherein the method comprises:
   recording a reference to a use case comprising one or more further steps such that the further step or one of the further steps have a resultant effect which is the same as the resultant effect of the task step, wherein the use case is a representation of the task step associated with determining the one or more changes in the business entities;
   recording a refinement relationship between the task step and the use case, the refinement relationship having an associated justification stating how the task step is realized by the use case;
   determining that the resultant effect of the task step is the same as the resultant effect of the further step or one of the further steps by using one or more justifications; and
   qualifying the use case by removing context-specific information, wherein context-specific information includes one or more attributes of the use case that are associated with an environment in which the use case is used;
   wherein the use case is stored elsewhere with no context-specific information, thereby allowing re-use of the use case.

9. The method as claimed in claim 8 wherein the further steps collectively define a main success scenario.

10. The method as claimed in claim 8 comprising recording a justification demonstrating how the resultant effect is realised by the one or more further steps.

11. The method as claimed in claim 8 further comprising determining the extent of the software development on the basis of the refinement relationship.

12. The method as claimed in claim 11 wherein: the software development is a project; the project has a project life-cycle; and the refinement relationship states what stage of the project life-cycle the project is at.

13. A non-transitory computer readable medium having program instructions for a software tool executed by a computer for developing software capable of performing a task, the task comprising a task step required to perform the task, the task step having a resultant effect and determining one or more changes in business entities, wherein the tool comprises:
   logic for recording a reference to a use case comprising one or more further steps such that the one or more further steps have a resultant effect which is the same as the resultant effect of the task step, wherein the use case is a representation of the task step associated with determining the one or more changes in the business entities;
   logic for recording a refinement relationship between the task step and the use case, the refinement relationship having an associated justification stating how the task step is realized by the use case;
   logic for determining that the resultant effect of the task step is the same as the resultant effect of the one or more further steps by using one or more justifications;
   logic for qualifying the use case by removing context-specific information, wherein context-specific information includes one or more attributes of the use case that are associated with an environment in which the use case is used; and
   logic for storing the use case elsewhere with no context-specific information, thereby allowing re-use of said use case.

* * * * *